No. 799,245. PATENTED SEPT. 12, 1905.
H. LEMP.
SELF PROPELLED VEHICLE.
APPLICATION FILED MAR. 31, 1904.

2 SHEETS—SHEET 1.

Witnesses

Inventor
Hermann Lemp
by Albert G. Davis
Atty

No. 799,245.  
PATENTED SEPT. 12, 1905.  
H. LEMP.  
SELF PROPELLED VEHICLE.  
APPLICATION FILED MAR. 31, 1904.

2 SHEETS—SHEET 2.

Witnesses.

Inventor:  
Hermann Lemp  
by Albert S. Davis  
Atty

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

SELF-PROPELLED VEHICLE.

No. 799,245. Specification of Letters Patent. Patented Sept. 12, 1905.

Application filed March 31, 1904. Serial No. 200,871.

*To all whom it may concern:*

Be it known that I, HERMANN LEMP, a citizen of the United States, residing at Lynn, in the county of Essex and State of Massachusetts, have invented certain new and useful Improvements in Self-Propelled Vehicles, of which the following is a specification.

My invention relates to automobile-drives; and its object is to provide a simple and efficient arrangement for propelling automobiles by means of which the flexibility of electric drives may be utilized and in addition all electric losses eliminated at high speed. An automobile arranged in accordance with my invention also possesses further advantages in operation, which will appear from the following specification and accompanying drawings, in which—

Figure 1:
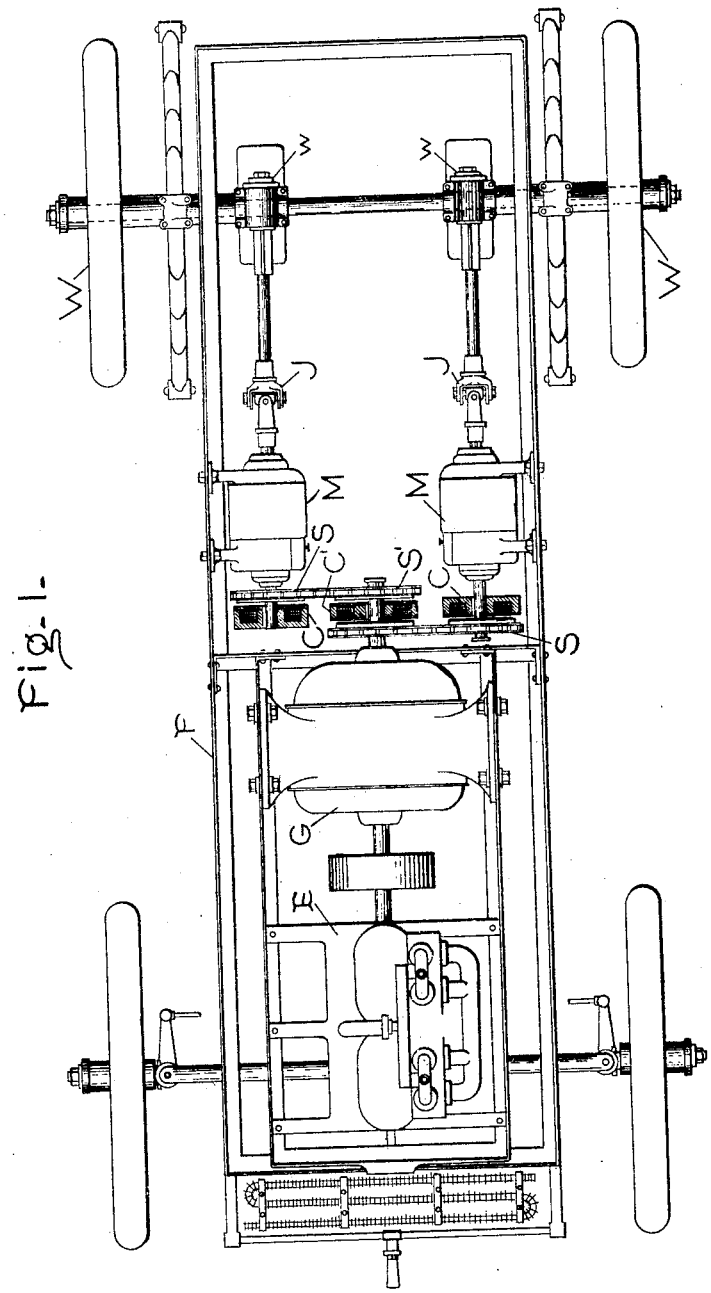
Figure 2:
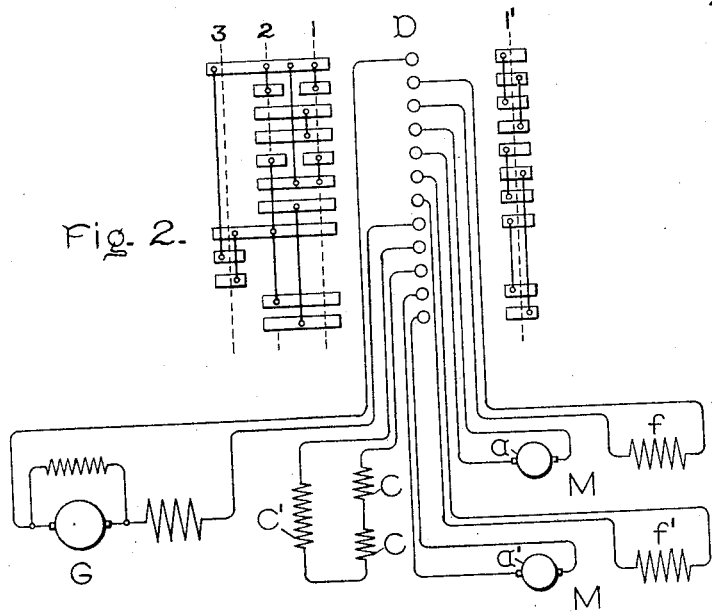
Figure 3:
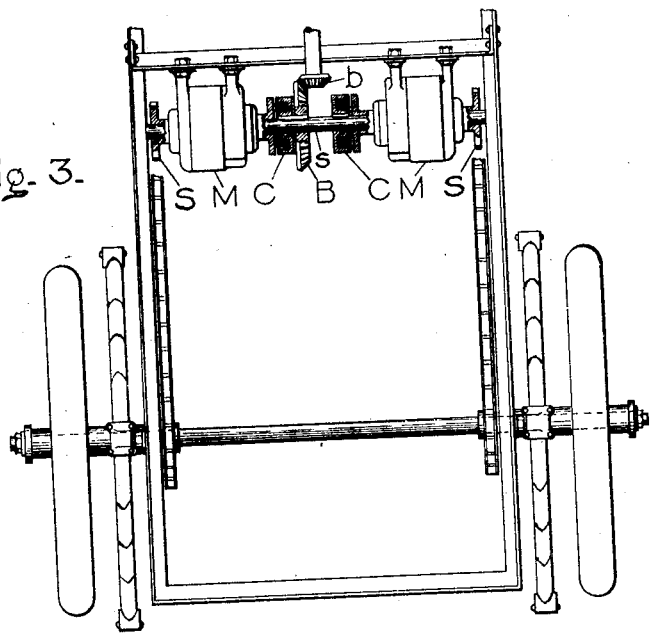

Figure 1 shows the driving mechanism of an automobile arranged in accordance with my invention. Fig. 2 shows diagrammatically an arrangement of circuits and controlling-switch adapted to my invention, and Fig. 3 shows a modified arrangement of the driving mechanism.

In Fig. 1, E represents a prime mover, such as a gas-engine, mounted on the frame F. G represents an electric generator mounted on the shaft of engine E. M M represent two motors, each supported from the frame F and each connected, through a universal joint J and worm-gear $w$, to a rear wheel W. On the shaft of generator G is keyed a magnetic clutch $C'$, and mounted loosely on the shaft are the two sprocket-wheels $S'$, each forming an armature for the clutch $C'$. On the shaft of each motor M is keyed a clutch C, and loosely mounted on each shaft is a sprocket-wheel S, connected by a sprocket-chain to one of the sprocket-wheels $S'$ on the generator-shaft. If the magnetic clutches are all deënergized and the motors are connected in circuit with the generator, the generator will drive the motors and through them the rear wheels. As long as the clutches are deënergized the sprocket-chains carry no load. With this arrangement all the advantages of flexibility and ease of control of an electric drive may be utilized. No differential gears are necessary, as the two motors produce the proper differential action. When high speed is reached, the motors M may be cut out of circuit and the clutches $C'$ C C energized. Sprocket-wheels $S'$ will then be locked to the generator-shaft, and each of sprocket-wheels S will be locked to its shaft. The shaft of the prime mover E will then be mechanically connected, through the clutches, to the rear wheels, the motor-armatures will run idle, and the electric losses will be eliminated. With the clutches energized there is no differential driving action upon the rear wheels. This is an advantage at high speeds, since the liability of skidding is thereby diminished.

Referring to Fig. 2, I have shown an arrangement of circuits and a controlling-switch adapted to my invention. G represents the generator, which I have shown as compound-wound. M M represent the motors, the fields and armatures of which are designated by $f$ and $a$ and $f'$ and $a'$, respectively. $C'$ C C represent the coils of the magnetic clutches of Fig. 1. D represents a controlling-switch having three positions, 1, 2, and 3, as shown by dotted lines, for forward rotation, and one position $1'$ for backward rotation. With the controlling-switch in the position 1 it will be seen that the circuit is closed from the left-hand brush of the generator G through field $f$, through armature $a$, through field $f'$, through field $a'$ to the right-hand brush of the generator G. Thus the two motors are connected in series. When the controlling-switch is moved to position 2, the motors are connected in parallel, as will be seen by tracing out the circuits. When the controlling-switch is moved to position 3, the motor-circuits are open and the generator-circuit is closed through the coils $C'$, C, and C. Position $1'$ for backward rotation connects the motors in series to the generator, but with the fields reversed.

Referring again to Fig. 1, it will be seen that the clutch $C'$ may be omitted, the sprocket-wheels S and $S'$ in this case being keyed to the generator-shaft and rotating at all times with the engine speed, or, on the other hand, clutches C C may be omitted and the sprocket-wheels S and $S'$ keyed to the motor-shafts, the sprocket-wheels in this case always rotating at the motor speeds. The advantage of the three clutches consists in the elimination of all liability to heating and binding of the sprocket-wheels on the shafts.

Fig. 3 shows a modified arrangement in which the generator-shaft carries a bevel-gear *b*, which engages a bevel-gear B on the shaft *s*. The motors M M have their armatures sleeved on shafts *s* and are connected to the rear wheels by the sprocket-wheels S and the sprocket-chains driven thereby. The magnetic clutches C C each have one member keyed to shaft *s*, and the other member is carried by a motor-armature. With this arrangement, as in Fig. 1, the speed of the motors and of the driven wheels may be controlled independently of the generator speed, while at high speeds the clutches C C may be energized and the motors cut out of circuit, thereby connecting the prime mover mechanically to the rear wheels and eliminating electrical losses. In this arrangement also differential action is absent at the high speed.

Other forms of mechanical connections and other arrangements of the clutches may be readily devised, and accordingly I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. In a self-propelled vehicle, a prime mover, an electric generator driven thereby, two electric motors adapted to be driven by said generator, each mechanically connected to a driving-wheel of said vehicle, and means for mechanically connecting said prime mover to said driving-wheels.

2. In a self-propelled vehicle, a prime mover, an electric generator driven thereby, two electric motors, each mechanically connected to a driving-wheel of said vehicle, means for connecting said motors in circuit with said generator, and means for clutching the shaft of said prime mover to said motors.

3. In a self-propelled vehicle, a prime mover, an electric generator driven thereby, two electric motors, each mechanically connected to a driving-wheel, means for connecting said motors in circuit with said generator, means for varying the speed of said motors, and means for clutching the shaft of said prime mover to said driving-wheels.

4. In a self-propelled vehicle, a prime mover, an electric generator driven thereby, two electric motors, each mechanically connected to a driving-wheel of said vehicle, electromagnetic clutches adapted to clutch the shaft of said prime mover to said driving-wheels, means for connecting said motors to said generator in series and in parallel, and means for opening the motor-circuit and energizing said clutches.

5. In a self-propelled vehicle, a prime mover, an electric generator driven thereby, two electric motors, each mechanically connected to a driving-wheel of said vehicle, electromagnetic clutches adapted to clutch the shaft of said prime mover to said driving-wheels, and a controlling-switch adapted to connect said motors in series to said generator, then to shift the connection of said motors to parallel, and then to disconnect the motors and to connect said clutches to said generator.

In witness whereof I have hereunto set my hand this 29th day of March, 1904.

HERMANN LEMP.

Witnesses:
   DUGALD McK. McKILLOP,
   JOHN J. WALKER.